US005509762A

United States Patent [19]
Fredricksen

[11] Patent Number: 5,509,762
[45] Date of Patent: Apr. 23, 1996

[54] DRILL BIT CENTERING DEVICE

[76] Inventor: Robert L. Fredricksen, 192 New Jersey Ave., Bergenfield, N.J. 07621

[21] Appl. No.: 404,910

[22] Filed: Mar. 16, 1995

[51] Int. Cl.⁶ .................................................. B23B 45/00
[52] U.S. Cl. .............................................. 408/80; 408/112
[58] Field of Search ............................... 408/72 R, 72 B, 408/79, 80, 81, 119, 112, 200, 201, 110

[56] References Cited

U.S. PATENT DOCUMENTS

| | | | |
|---|---|---|---|
| 2,224,480 | 12/1940 | Kartarik | 408/81 |
| 2,335,614 | 11/1943 | Spievak | 408/112 |
| 2,479,774 | 8/1949 | Pierce | 408/112 |
| 2,792,726 | 5/1957 | Vick | 408/81 |
| 4,138,200 | 2/1979 | Nazarenus | 408/112 |

Primary Examiner—Daniel W. Howell
Attorney, Agent, or Firm—Terrance L. Siemens

[57] ABSTRACT

A drill bit centering device with a substantial intermediate open area between a top locking collar and a bottom centering cone is provided. A drill bit of the centering device is attached in an opening in the top collar and passes through the bottom cone and is surrounded by a spring. The area between the upper and lower members allows for the simple escape of shavings and chips from a drilling operation. The spring serves as the sole connecting member between the sleeves of the collar and cone. The spring, collar, attached bit, and cone rotate as an integral assembly.

4 Claims, 1 Drawing Sheet

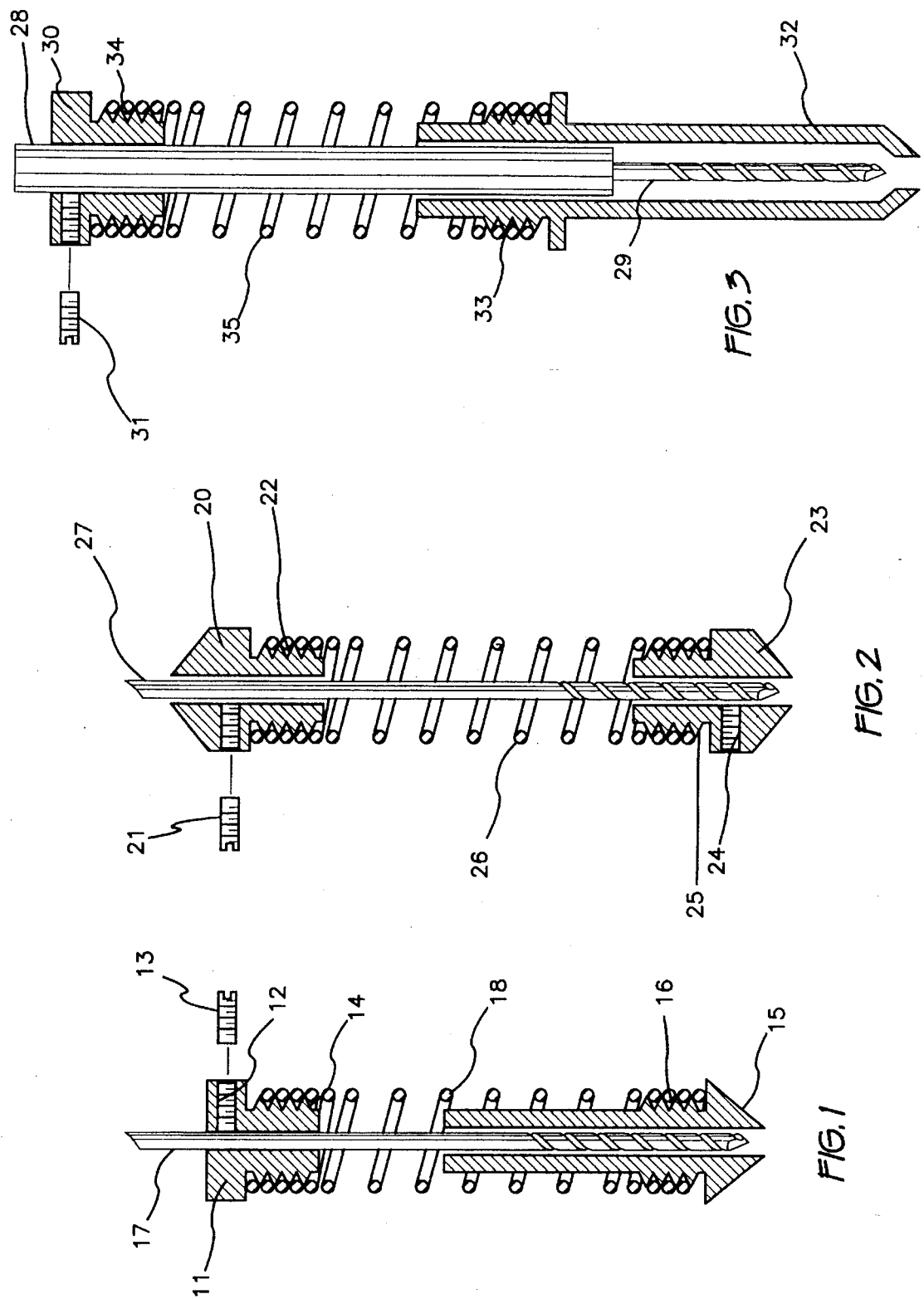

DRILL BIT CENTERING DEVICE

BACKGROUND OF THE INVENTION

1. Field of the Invention

The present invention relates to a tool that enables centering of a drill bit to accurately center a hole after an initial countersink has been bored in the workpiece. The fields most likely to benefit from this invention are the construction and home building trades. However, the beneficial aspects of the invention may also be utilized in other fields such as the machine tool industry.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

It has long been difficult to accurately center a drill hole in an existing countersink in a workpiece. In prior drill bit centering devices it has been difficult to drill accurately in various materials. In special uses additional tools such as chisels to align the drill bit after an initial countersink has been bored, are required.

Prior art drill guides were often of considerable length due to the construction of an extendible and retractable guide member. This demanded the use of twist drills or cutting tools of considerably greater length than was actually required for the drilling operation. These greater lengths often exceeded the ordinary standard drill lengths for given diameters of drills.

One technique, used in the past, was to almost completely enclose the entire length of a centering device for drill bits. The result was that only minimum space was available for escape of cuttings, shavings and chips generated from the drilling.

A self-centering bit is described in U.S. Pat. No. 2,792,726 issued to Selmer E. Vick on May 21, 1957. The Vick patent discloses an outer barrel with an enclosed spring and two holes or slots in a barrel surrounding the bit. This permits limited escape of any shavings which follow or flow up the bit into a sleeve. By contrast, the instant invention has an open spring between a locking collar and a centering cone which surrounds the exterior of a drill bit, allowing an enlarged discharge area for shavings from the drilling.

The bit centering device in U.S. Pat. No. 2,224,480 issued to Joseph Kartarik on Dec. 10, 1940 shows a spring between a threaded cap and slidable section. Intermediate sections are provided with openings to permit the escape of drilling scraps outwardly. A contrast with the instant invention is that the intermediate section is substantially open between the locking collar and centering cone between the turns of the enclosing spring.

In U.S. Pat. No. 2,479,774 issued to Clyde A. Pierce on Aug. 23, 1949, discloses a drill bit centering attachment having holes to allow shavings to escape. By contrast the instant invention has an expanded discharge area between the locking collar and centering cone.

U.S. Pat. No. 2,335,614 issued to Louis A. Spievek on Nov. 30, 1943 shows a counterbore and a laterally extending opening in the side of a pressure foot providing ejection space for cuttings or chips. In contradistinction, the instant invention is a one piece shank and drill bit combined with screw thread type projections for the opposite ends of the spring between its locking collar and centering cone.

None of the above inventions and patents, taken either singly or in combination, is seen to describe the instant invention as claimed. As will be seen, the simplicity and effectiveness of my invention is not rivaled in the prior art.

SUMMARY OF THE INVENTION

Briefly, the invention provides an expanded area for shavings, cuttings and chips from a drilling operation by having an open spring surrounding a drill bit providing an enlarged area of escape between the turns of the spring. The spring is located intermediate a locking collar and a conical centering cone. The conical centering cone holds the bit centrally in a countersink in the work by virtue of the spring compression force generated as the bit is forced into the work by the operator.

The drill bit centering device of the present invention has at its top end a locking collar with a central bore including an opening into the interior thereof for one or more set screws. The set screw or screws secure a drill bit within the collar. Extending downwardly from the collar is an integral externally spiraled first sleeve portion. The external spiral portion is similar to a screw thread but is dimensioned to accommodate the collapsed formed end of a compression spring. The bottom conical centering cone has a central bore in which the drill bit is rotatable and translatable. The centering cone has a conical tapered end and plural externally spiraled projections on a second sleeve portion formed integrally with the cone. The other end of the spring is attached the spiral projections in a similar manner as the first end is attached to the top end locking collar.

The improvement in the drill bit centering device of the invention is an enlarged discharge area. A spring between the top locking collar and bottom centering cone with its ends fitting in and secured to the locking collar and centering cone is the key to the invention. The drill bit, collar, cone and spring simultaneously rotate.

The main advantage of this invention involves the configuration of the device with a relatively large central area substantially open to define an escape area for the cuttings, shavings and chips that have flowed upwards from the drilling operation.

Accordingly, it is a principal object of the invention to provide a new and improved drill bit centering device which overcomes the disadvantages of the prior art in a simple but effective manner.

Another object of the invention is to provide a device for automatically centering a hole in a pre-existing countersink.

Another object of the invention is to provide a locking collar and centering cone which are identical so as to allow reversal after a period of wear.

It is a further object of the invention to provide for the exchange of the top locking collar for the bottom centering cone when the centering cone becomes worn, thus doubling the tool life.

It is also an object of the invention to have the intermediate area of the drill bit centering device open except for the interposed spring between the locking collar and centering cone.

Another object is to provide a one piece shank and drill bit for a centering device.

Finally, it is a major goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a cross-sectional side view of an embodiment illustrating a drill bit centering device with the upper locking collar and bottom centering cone spaced apart by an interposed spring;

FIG. 2 is a cross-sectional side view of an alternate embodiment where the upper locking collar and the lower centering cone are identical and interchangeable; and FIG. 3 is a cross-sectional side view of a further embodiment detailing a one piece shank and drill bit to be used in the drill bit centering device of the invention.

DETAILED DESCRIPTION OF THE PREFERRED EMBODIMENTS

The novel drill bit centering device shown in FIG. 1 is formed with a top locking collar 11. A shoulder on locking collar 11 has an opening 12 into its interior for one or more set screws 13 securing for drill bit 17. Extending downwardly from the shoulder are externally spiraled projections 14. The bottom section 15 of the drill bit centering device is configured to have a tapered end and a second set of externally spiraled projections 16. Drill bit 17 is secured in top locking collar 11 by one or more set screws 13. Bit 17 passes through and is translatable with respect to cone 15. Surrounding bit 17 between projections 14 and 16 is a spring 18. The end turns of spring 18 are located in and secured to the projections 14, 16. Spring 18 is the sole connecting member between locking collar 11 and centering cone 15o Shavings and chips that flow up a central opening in centering cone 15 are easily discharged through the open areas between the turns in spring 18.

FIG. 3 shows an embodiment of a drill bit centering device showing a one piece shank and drill bit with the drill rod 28 brazed to the bit 29. Surrounding the one piece shank and drill bit 28, 29 is locking collar 30 having a threaded opening for securing shank 28 with one or more set screws 31. Cone 32 and collar 30 are formed with plural projections 33, 34 anchoring the respective ends of spring 35 similar to the other embodiments. Collar 30, cone 32, drill bit 28, 29, and spring 35 rotate simultaneously during a drilling operation. The inner surface of cone 32 is fluted (not shown) to allow upward passage of shavings past shank 28.

The embodiment shown in FIG. 2 shows top locking collar 20 with its threaded opening for one or more set screws 21. On the under side of collar 20 there is an integral sleeve formed with threaded projections 22. The bottom centering cone 23 is identical to the top collar 20 with a tapered cone, one or more set screw openings 24 and threaded projections 25. The length of the sleeves for the top and bottom members 20, 23 are equal. Spring 26, located around bit 27, connects top and bottom members 20, 23 with its end turns secured to their threaded projections. The spring end turns resist being dislocated by the relative movement of the drill bit centering device and enclosed drill bit 27 during its normal operation.

The above embodiments illustrate centering cones allowing improved centering of drill bits in appropriately sized countersinks with improved accuracy. Where screws are used in the fastening of a member to another component, it is necessary that the screws be started exactly in the center of the countersunk hole. By means of the instant invention true centering can be readily and accurately performed.

Each embodiment of the present invention has been configured by a technique where an intermediate space between a top locking collar and a bottom centering cone are surrounded by a spring. The drill bit, collar, cone and spring rotate together during a drilling operation. The drill bit centering device has been specifically designed and detailed to allow a maximum opening so that shavings and chips have an enlarged area for their removal. This essential feature is provided by the openings in the enclosing spring turns between the respective locking collars and centering cones of FIGS. 1–3.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could modify the drill bit centering device by changing the number of threaded projections, having various sized openings, and varying the sleeve lengths of the top and bottom members. These would all allow the open intermediate area for the discharge of cuttings and chips in a drilling operation.

It is to be understood that the present invention is not limited to the embodiments described above, but encompasses any and all embodiments within the scope of the following claims:

I claim:

1. A drill bit centering device for use with a drilling machine, the centering device having a top end and a bottom end comprising;

a locking collar including;
        a central bore at the top end,
        a shoulder with an opening for the insertion of a set screw, said set screw securing a drill bit enclosed within said collar,
        a downwardly extending, externally threaded first sleeve portion integral with said collar;
    a centering cone including;
        a central bore at the bottom end,
        an upwardly extending, externally threaded second sleeve portion, said sleeve portion being integral with said centering cone;

a spring extending between said locking collar and said centering cone, said spring anchored by said externally threaded portions of said first and second sleeve portions, whereby said spring serves as a sole connecting member between said first and second sleeve portions.

2. The drill bit centering device according to claim 1, further including an intermediate open area defined by the distance between the sleeves and surrounded by the spring, said open area allowing shavings and chips flowing upwards along said bit to escape from said device.

3. A drill bit centering device for use with a drilling machine, the centering device having a top end and a bottom end comprising;

a locking collar including;

a central bore at the top end, a shoulder with an opening for the insertion of a set screw, said set screw securing a drill bit enclosed within said collar, a downwardly extending, externally threaded first sleeve portion integral with said collar;

a centering cone including;

a central bore at the bottom end, an upwardly extending, externally threaded second sleeve portion, said sleeve portion being integral with said centering cone, wherein said centering cone is substantially identical to said locking collar;

a spring extending between said locking collar and said centering cone, said spring anchored by said externally threaded portions of said first and second sleeve portions, whereby said spring serves as a sole connecting member between said first and second sleeve portions.

4. The drill bit centering device according to claim 3, wherein said substantially identical locking collar and centering cone are interchangeable.

\* \* \* \* \*